June 12, 1962    E. GRANBERG    3,038,355
APPARATUS FOR FILING AND JOINTING SAW CHAINS
Filed March 7, 1958
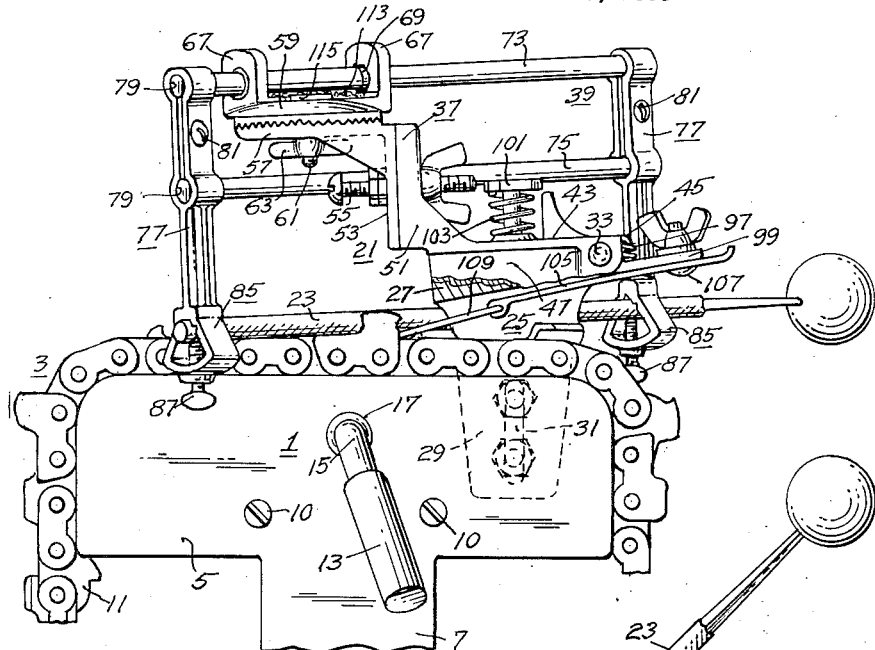
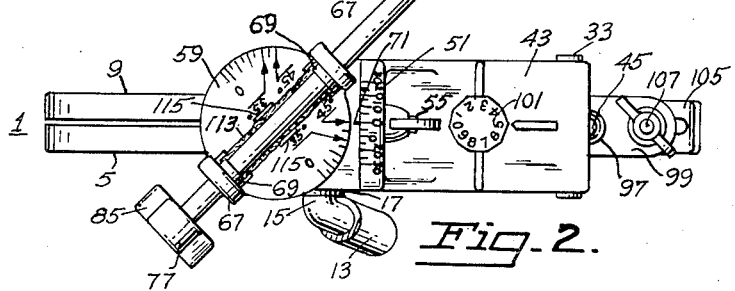
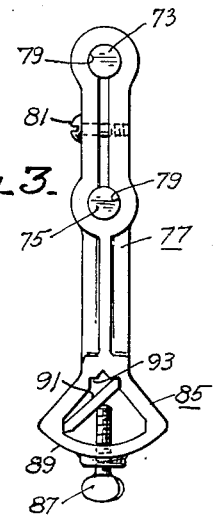
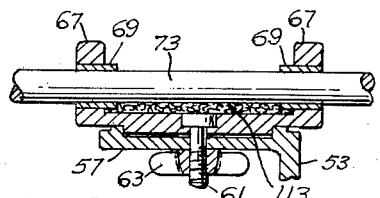
INVENTOR.
ELOF GRANBERG
BY Bruce & Brosler
HIS ATTORNEYS

United States Patent Office 3,038,355
Patented June 12, 1962

3,038,355
APPARATUS FOR FILING AND JOINTING SAW CHAINS
Elof Granberg, Richmond, Calif., assignor to Nygran Industries Ltd., a corporation of Canada
Filed Mar. 7, 1958, Ser. No. 719,894
7 Claims. (Cl. 76—31)

My invention relates to the filing and jointing of saws and more particularly to the filing and jointing of saw chains of the type incorporated in chain saws, and involves improvements on the device of my patent for Chain Saw Sharpening and Jointing Apparatus, No. 2,818,752 of January 7, 1958.

Among the objects of my invention are:

(1) To provide a novel and improved filing and jointing apparatus for saw chains;

(2) To provide a novel and improved filing and jointing apparatus for saw chains, which apparatus is adapted for clamping in a vise when put to use, or for permanent installation on a work bench;

(3) To provide a novel and improved filing and jointing apparatus for saw chains, which apparatus is provided with built in lubrication facilities;

(4) To provide a novel and improved filing and jointing apparatus for saw chains, which apparatus is resistant to torsional or twisting stresses;

(5) To provide a novel and improved filing and jointing apparatus for saw chains, which apparatus permits of variations in the angular disposition of a double beveled file useful in jointing the teeth of a saw chain.

Additional objects of my invention will be brought out in the following description of a preferred embodiment of the same, taken in conjunction with the accompanying drawings wherein;

FIG. 1 is a side view in elevation of the apparatus of the present invention;

FIG. 2 is a plan view of the apparatus of FIG. 1;

FIGS. 3 and 4 are detail views depicting features of the apparatus of FIG. 1.

Referring to the drawings for details of my invention in its preferred form, the apparatus illustrated therein comprises a saw chain vise 1 adapted to grip and hold a saw chain 3, such vise involving a fixed jaw 5 having an integral supporting stem 7 adapting it for mounting in a bench vise, or permanently to a bench, and a movable jaw 9 which is affixed to the fixed jaw by a pair of machine screws 10 and in parallel spaced relationship thereto, to receive and clamp between the two jaws, the guide tabs 11 on the links of such chain.

The jaws are of a length to grip but a few links or so, thus permitting shifting the chain a link at a time as they are sharpened and allowing the chain to drape over the vise during sharpening of the intermediate links.

The normal open space between the jaws is just sufficient to comportably permit of the insertion of the guide tabs of the saw chain links, following which the spacing between the jaws may be narrowed by means of a clamp handle 13 having a stem 15 passing through both jaws and provided with a coarse thread to receive a clamping nut. A shoulder 17 on the stem, bears against the fixed jaw, whereby with a coarse thread on the stem, a partial turn of the handle will be sufficient to draw the jaws of the vise into clamping engagement with the guide tabs 11 on the saw chain.

In conjunction with the saw chain vise just described, I provide an assembly means 21 for supporting a file 23 in operative position with respect to a saw chain clamped in the vise. Such a file supporting assembly means comprises a mounting bracket 25, preferably in the form of a casting including a supporting base 27 and a leg 29 depending therefrom adjacent an edge of the supporting base, the leg 29 being provided with a slot 31 for mounting the base on one of the jaws of the vise, with the base 27 overlying the vise.

Connected to the base at one end thereof, by a hinge pin 33 is a compound adjustable bracket 37 which slidably supports a file carrying frame 39. The compound adjustable bracket 37 involves a lower section including a horizontal portion 43 overlying the base 27 and including a depending tab 45 at one end thereof, such horizontal portion having side flanges 47 through which the hinge pin 33 extends to hingedly secure the bracket 37 to the base 27.

Integral with the horizontal portion 43 of the lower section is a vertical supporting wall 51 terminating in an upper edge of semi-circular contour and which may be graduated to either side of its uppermost point in terms of degrees. On this vertical supporting wall is rotatably mounted the upper section of the adjustable bracket 37, this upper section including a vertical circular wall 53 matching the curvature of the supporting wall 51 and retained thereon by an adjustable clamping screw 55 passing through each at their centers of curvature.

Integral with the vertical circular wall 53 of the upper section of the bracket, is a horizontal circular platform 57 on which is rotatably mounted a matching plate or disc 59 by means of a screw 61 depending therefrom through the platform 57 and carrying at its exposed end, a wing nut 63. The disc 59 has a pair of diametrically disposed upstanding ears 67 fitted with bearings 69 in which is slidably supported the file frame 39.

The contacting surfaces of the platform 57 and disc 59 are similarly serrated by radial grooves to provide for angular adjustment of the disc with respect to a reference marking 71 on the upper section of the bracket, the disc for this purpose, being graduated in terms of degrees on its upper surface. The reference marking referred to at the same time, serves as a reference marking for the calibration markings on the supporting wall 51 of the lower section of the bracket. Thus by means of the adjustable bracket 37, the file frame 39 may be adjusted for operation in both the vertical and horizontal planes.

The file frame 39 includes a pair of vertically spaced horizontal rods 73, 75 anchored in a pair of similar end members 77 in which the rods are securely clamped, after the upper rod 73 has been threaded through the bearings in the upstanding ears 67.

To facilitate the clamping of such rods in the end members of the frame, each end member is formed with an opening 79 to snugly receive an end of each rod, and between such openings, each end member is slotted. Following insertion of the rods in the openings 79, they are clamped in the end members by clamping screws 81 passing through one side of an end member at a point intermediate the rods and threadedly engaging the other side of the end member, whereby upon tightening of the clamping screw, the ends of the rods are securely anchored. Such anchoring of the rods in the frame end members serves to rigidify the file frame and enables the frame to more effectively resist torsional or twisting stresses developed during use of the apparatus.

Each end member terminates at its lower end in a substantially triangular frame 85 to receive and support one end of a file and in which such file may be clamped. Such clamping is effected by a clamping screw 87 threadedly passing through the lower or base portion 89 of the frame to engage a file positioned therein and clamp it. A round file employed in sharpening chipper type teeth will be clamped at the apex of the triangular shaped frame. Chisel type teeth will require the use of a double beveled file 91 which when employed, may be clamped against one of the sloping sides of the frame.

In some instances, however, a change in angle is required when employing a double beveled file, and provision is made for this in the present invention by providing a notch 93 in each of the sloping sides of the frame at a point near the apex thereof as indicated in FIG. 3, to provide the desired change in angle. The clamping screw when tightened against the file in this position will serve to retain it therein while in use.

The entire file supporting assembly 21 including the compound bracket 37 and the file frame 39, is normally urged toward contact with the base 27 to which it is pivotally affixed, by a compression spring 97 disposed between the depending tab 25 at the end of the horizontal portion 43 of the bracket, and a tail extension 99 from the base 27.

Angular adjustments of the file supporting assembly about its pivot or hinge axis are provided for by an adjusting screw 101 threadedly passing through the horizontal portion 43 of the lower section of the compound bracket and engaging the base 27. A compression spring 103 about this adjusting screw serves to maintain adjustments.

To accurately locate a chain link to be operated on, relative to a file in the holder, prior to clamping the saw chain in the vise, a gauge is provided which includes an adjustable anchor strip 105 having a longitudinal slot therein, this anchor strip being disposed against the under side of the supporting base 27 where it is held by a clamping bolt 107 passing through the slot and an opening in the tail extension 99 of the base, and a wing nut threaded thereon. A stop finger 109 is hingedly secured loosely to an end of the anchor strip, and by reason of its hinged connection thereto, is free to fall into engagement with the saw chain.

In utilizing this gauge, a tooth to be operated thereon, is urged against the stop finger, the saw chain is then clamped in the vise, and the file supporting assembly is then adjusted to bring the file in proper relationship to the tooth to be operated on. Once the gauge is set and the file supporting assembly properly adjusted, the same relationship will prevail for all similar links in the particular chain.

With the adjustment thus effected, sharpening of a particular tooth is accomplished by running the file against the edge of the tooth to be sharpened. Overfiling a particular tooth is precluded by utilizing the clamping screw 55 as a stop gauge, it being on the arc of swing of the lower rod 75 of the file frame which rod will abut the screwhead when filing should be terminated. This assures all teeth to be of uniform length.

To assure proper and smooth action of the file frame in the bearings 69, an oil pad 113 is positioned on the disc 59 between the upstanding ears 67, this pad being of sufficient thickness to cause the upper rod 73 to slide in contact therewith during filing, whereby the rod will be continually lubricated and maintained clean when in use. Such oil pad is preferably held against lateral displacement by ribs 115 cast integrally with the disc, and is precluded from vertical displacement by the rod itself.

From the foregoing description of my invention in its preferred form, it will be apparent that the same fulfills all the objects thereof, and while I have illustrated the same in considerable details, the features of the invention therein are subject to alteration and modification without departing from the underlying principles involved, and I accordingly do not desire to be limited in my protection to the specific details thus illustrated and described except as may be necessitated by the appended claims.

I claim:

1. Apparatus for filing and jointing a saw chain following removal of the same from a chain saw, said apparatus comprising a saw chain vise involving a fixed jaw having a supporting stem, a movable jaw affixed to said fixed jaw in parallel spaced relationship thereto to receive and clamp between them the guide tabs on the links of a saw chain, said jaws being of a length to permit draping of such chain over said vise, and means for narrowing the spacing between said jaws to clamp such saw chain between them; means for supporting a file in operative position with respect to a saw chain clamped in said vise, said file supporting means comprising a mounting bracket including a file holder supporting base and a leg depending therefrom for mounting said base to said vise, a file holder secured to said base; and an adjustable gauge for accurately locating a chain link relative to a file in said holder prior to clamping such saw chain in said vise, said gauge including an adjustable anchor strip having means for clamping the same to said base, and a stop finger hingedly secured loosely to an end of said anchor strip and adapted to drop into engagement with a saw chain held in said vise.

2. Apparatus for filing and jointing a saw chain following removal of the same from a chain saw, said apparatus comprising a saw chain vise involving a fixed jaw having a supporting stem, a movable jaw affixed to said fixed jaw in parallel spaced relationship thereto to receive and clamp between them the guide tabs on the links of a saw chain, said jaws being of a length to permit draping of such chain over said vise, and means for narrowing the spacing between said jaws to clamp such saw chain between them; means for supporting a file in operative position with respect to a saw chain clamped in said vise, said file supporting means comprising a mounting bracket including a file holder supporting base and a leg depending from adjacent an edge of said base, said leg having a slot for mounting said base on a jaw of said vise with said base overlying said vise, and a file holder hingedly secured to said base; and an adjustable gauge for accurately locating a chain link relative to a file in said holder prior to clamping such saw chain in said vise, said gauge including an adjustable anchor strip having means for clamping the same to the underside of said file holder supporting base, and a stop finger hingedly secured loosely to an end of said anchor strip and adapted to drop into engagement with a saw chain held in said vise.

3. Apparatus for filing and jointing a saw chain following removal of the same from a chain saw, said apparatus comprising a saw chain vise involving a fixed jaw having a supporting stem, a movable jaw affixed to said fixed jaw in parallel spaced relationship thereto to receive and clamp between them the guide tabs on the links of a saw chain, the spacing between jaws being but slightly in excess of the thickness of said guide tabs, said jaws being of a length to permit draping of such chain over said vise, and means for narrowing the spacing between said jaws to clamp such saw chain between them; means for supporting a file in operative position with respect to a saw chain clamped in said vise, said file supporting means comprising a mounting bracket including a file holder supporting base and a leg depending from adjacent an edge of said base, said leg having a slot for mounting said base on a jaw of said vise with said base overlying said vise, and a file holder hingedly secured to said base; and an adjustable gauge for accurately locating a chain link relative to a file in said holder prior to clamping such saw chain in said vise, said gauge including an adjustable anchor strip having a longitudinal slot therein, said anchor strip being disposed against the underside of said file holder supporting base, and a clamping bolt passing through said slot and adapted to clamp said strip to the underside of said supporting base, and a stop finger hingedly secured loosely to an end of said anchor strip and adapted to drop into engagement with a saw chain held in said vise.

4. In combination, an adjustable gauge for accurately locating a saw chain link relative to a file in a file holder prior to clamping such saw chain in a vise on which said file holder is adapted to be mounted, said gauge including an adjustable anchor strip having a longitudinal slot therein, said anchor strip being disposed against the underside of said file holder, a clamping bolt passing through said slot and clamping said strip to the underside of said file holder, and a stop finger hingedly secured loosely to an end of said anchor strip and adapted when said file holder is mounted on such vise, to drop into engagement with a saw chain held in such vise.

5. A file carrying frame for apparatus for filing and jointing a saw chain, comprising a pair of end members each including a pair of openings to receive connecting rods, one of said openings being at an end of such member, a longitudinal slot connecting said openings, clamping means on each of said end members intermediate said opening, a pair of rods having their ends in said openings and clamped in said end members by said clamping means, and means for supporting a file in said frame, said means including a triangular shaped frame at the opposite end of each of said end members, said triangular shaped frame having a notch in the sloping sides thereof in proximity to the apex of said frame.

6. A file carrying frame for apparatus for filing and jointing a saw chain, comprising a pair of end members each including a pair of openings to receive connecting rods, one of said openings being at an end of such member, a longitudinal slot connecting said openings, a clamping screw passing through one side of said member at a point intermediate said openings and threadedly engaging the opposite side of said member, a pair of rods having their ends in said openings and clamped in said end members by said clamping screws, and means for supporting a file in said frame, said means including a triangular shaped frame at the opposite end of each of said end members, said triangular shaped frame having a notch in the sloping sides thereof in proximity to the apex of said frame.

7. Apparatus for filing and jointing a saw chain following removal of the same from a chain saw, said apparatus comprising a saw chain vise involving a fixed jaw and a movable jaw to receive and clamp between them the guide tabs on the links of a saw chain, means for narrowing the spacing between said jaws to clamp such saw chain between them and means for supporting a file in operative position with respect to a saw chain clamped in said vise, said file supporting means comprising a mounting bracket including a file holder supporting base and a leg depending from said base for mounting said base on a jaw of said vise and a file holder hingedly secured to said base, said file holder including a compound adjustable bracket including a lower section having a vertical supporting wall, an upper section having a matching vertical wall, clamping means for holding said upper section in fixed relationship to said lower section, said clamping means including an adjustable screw, a file carrying frame, means supporting said file carrying frame on said upper bracket section, said file carrying frame supporting means including a pair of spaced aligned bearings, and said file carrying frame including a pair of end members, a rod slidably passing through said bearings and connecting said frame end members, a second rod connecting said frame end members and adapted to abut said adjustable screw as a stop in determining the extent to which a file carried by said file carrying frame may operate on a saw chain in said vise.

References Cited in the file of this patent

UNITED STATES PATENTS

| 409,866 | Penrose | Aug. 27, 1889 |
| 424,724 | Penrose | Apr. 1, 1890 |
| 494,487 | Phillips | Mar. 28, 1893 |
| 635,476 | Gudmundson | Oct. 24, 1899 |
| 838,650 | Rudd | Dec. 18, 1906 |
| 1,223,191 | Merritt | Apr. 17, 1917 |
| 2,019,330 | Altman | Oct. 29, 1935 |
| 2,181,360 | Baumbach | Nov. 28, 1939 |
| 2,318,456 | Blum | May 4, 1943 |
| 2,458,058 | Carrol | Jan. 4, 1949 |
| 2,755,559 | Pearce | July 24, 1956 |
| 2,818,752 | Granberg | Jan. 7, 1958 |
| 2,833,165 | Irwin et al. | May 6, 1958 |
| 2,859,642 | Travis | Nov. 11, 1958 |
| 2,896,481 | Hebbert | July 28, 1959 |

FOREIGN PATENTS

| 8,639 | Sweden | Apr. 9, 1897 |